J. A. McGEE.
POWER TRANSMISSION MECHANISM.
APPLICATION FILED FEB. 11, 1913.

1,092,932.

Patented Apr. 14, 1914.

2 SHEETS—SHEET 1.

WITNESSES:
L. B. Woerner.
J. H. Swan.

INVENTOR,
JOSEPH A. McGEE,
By Minturn & Worner
ATTORNEYS.

J. A. McGEE.
POWER TRANSMISSION MECHANISM.
APPLICATION FILED FEB. 11, 1913.

1,092,932.

Patented Apr. 14, 1914.
2 SHEETS—SHEET 2.

WITNESSES:
L. B. Woerner
J. H. Swan

INVENTOR.
JOSEPH A. McGEE,
By Minturn & Worner
ATTORNEYS.

UNITED STATES PATENT OFFICE.

JOSEPH A. McGEE, OF BIG SPRING, INDIANA.

POWER-TRANSMISSION MECHANISM.

1,092,932.   Specification of Letters Patent.   Patented Apr. 14, 1914.

Application filed February 11, 1913. Serial No. 747,615.

*To all whom it may concern:*

Be it known that I, JOSEPH A. McGEE, a citizen of the United States, residing at Big Spring, in the county of Boone and State of Indiana, have invented certain new and useful Improvements in Power-Transmission Mechanism, of which the following is a specification.

The object of this invention is to provide a friction drive gearing for automobiles, motor trucks, and other conveyances carrying their own motive power, wherein a pair of disks rotating at a uniform continuous speed are made to drive a wheel mounted between and contacting with both of said disks, in forward or reverse direction, and at any desired speed from nothing to the maximum as determined by the greatest diameter of the disks, by changing the distance of the driven wheel from the axis of rotation of the two disks.

Another object is to transmit motion of rotation from the driven wheel to the axle of the conveyance, or the differential mechanism thereon, through the shaft on which the driven wheel is mounted.

Still another object of the invention is to provide end-thrust bearings against the outer ends of the shafts on which the pair of disks are mounted, and to provide means under the control of the operator for varying the pressure in opposition to said end-thrusts, as, for example, to lessen it while the position of the driven wheel radially of the disks is being changed.

The object, also, is to provide means for applying pressure against the outer sides of the disks opposite their places of contact with the driving wheel to increase the friction between said disks and wheel, and to provide automatic means for regulating said pressure.

A further object of my invention is to provide automatic means for varying the angular relation of the two disks to each other, in order to secure the requisite friction contacts with the driven wheel, at the different positions of the latter with relation to the axis of rotation of the two disks.

I accomplish the above principal objects, and also other minor objects which will hereinafter appear, by the mechanism illustrated in the accompanying drawings, in which—

Figure 1:
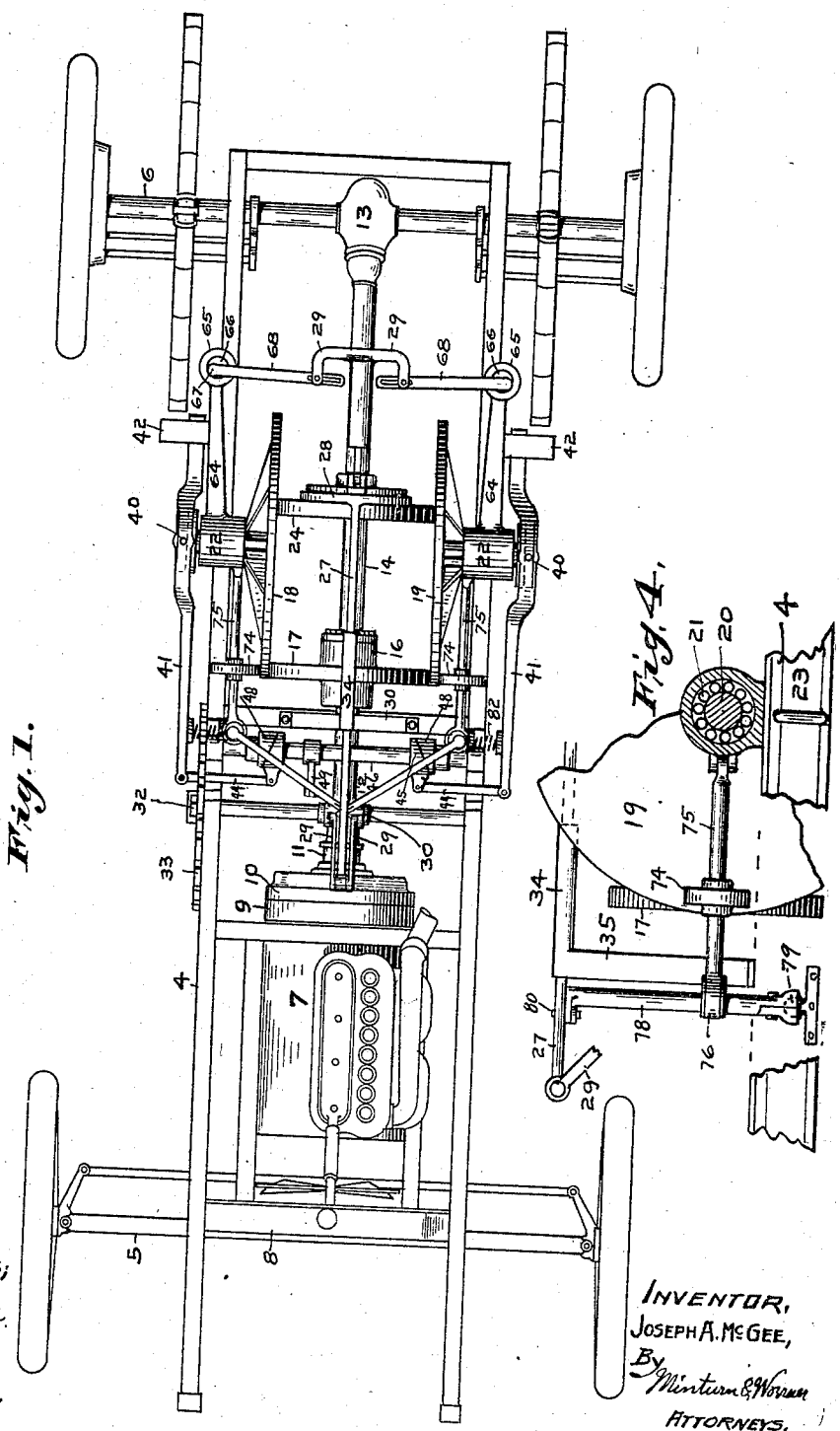
Figure 2:
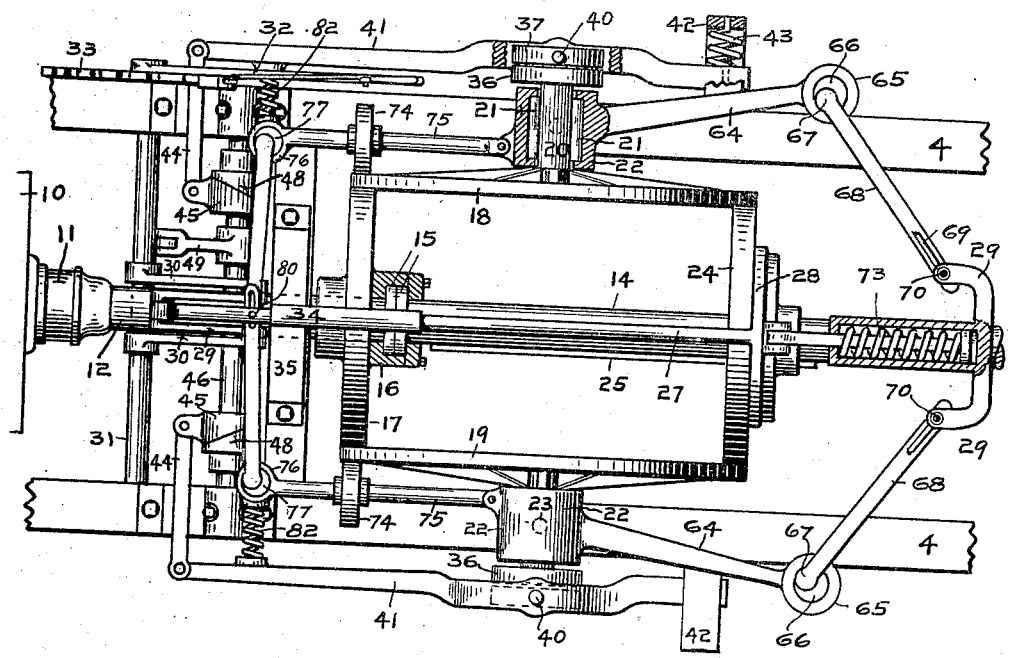
Figure 3:
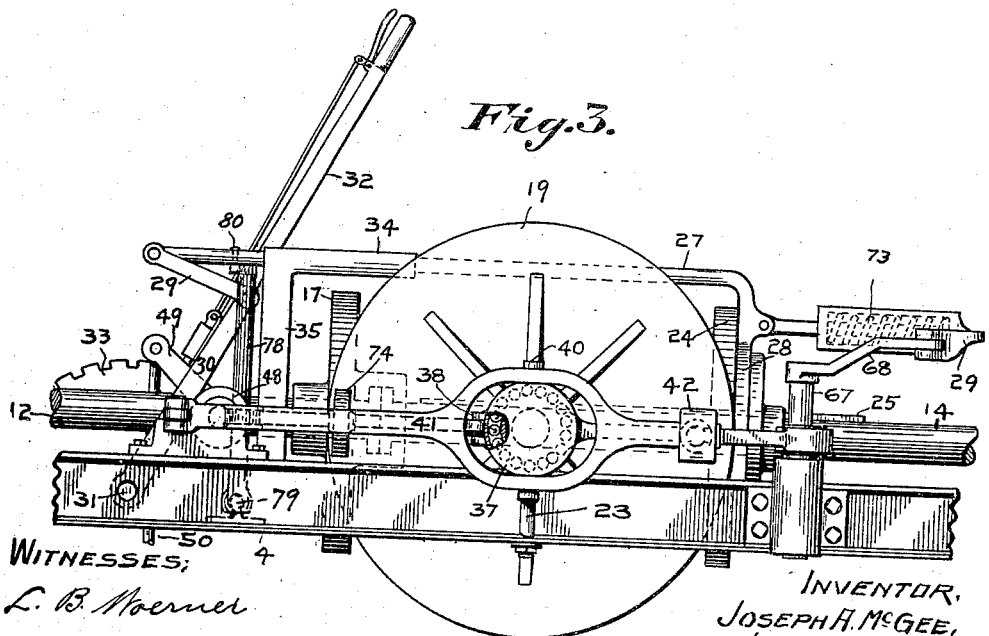

Figure 1 is a top plan view of the chassis of an automobile equipped with my invention, and showing the driven wheel at a position close to low speed. Fig. 2 is a like view on a relatively larger scale, of the part which particularly illustrates my invention, and shows the driven wheel at the position of high speed. Fig. 3 is a view in side elevation of the same mechanism which is illustrated in Fig. 2, and on the same scale as Fig. 2, and Fig. 4 is a fragment in side elevation illustrating the mechanism for regulating the pressure of the pressure wheels against the outer sides of the friction disks.

Like characters of reference indicate like parts throughout the several views of the drawings.

4 is the frame of an automobile, 5 the front and 6 the rear axle thereof, 7 the engine, here shown as a four-cylinder internal combustion engine; 8 is the radiator, 9 the fly wheel which has the usual friction clutch 10, and 11 the housing within which is a universal joint connection between the engine crank shaft (not shown) and its extension 12.

13 is a housing supported by the rear axle 6, within which the differential gearing (not shown) is assembled. The shaft from the connection with the engine crank shaft at the universal joint, extends longitudinally of the frame 4 to the differential gear in housing 13. This shaft is in two transversely separated parts 12 and 14, the adjacent ends of which parts both terminate with flanges 15, which are connected by a surrounding collar 16, here shown as being partly formed as the rear hub extension of a friction driving wheel 17. The friction driving wheel 17 is mounted upon and rotates with the shaft 12.

Contacting with the periphery of the wheel 17 at two diametrically opposite points of the latter are the friction disks 18 and 19. These disks are mounted on stub shafts 20, which are journaled on roller bearings 21 in boxes 22 supported by the frame 4 of the machine. The boxes 22 are preferably secured to the frame by vertical pivots 23, by which a swinging adjustment of the stub shafts 20 is secured which allows for the relative angular adjustment of the adjacent sides of the disks 18 and 19 to facilitate the adjustment thereagainst and radially of the two disks of a movable driven wheel 24, by means which will be hereinafter described.

The driven wheel 24 is of the same diameter as the continuously rotating driving wheel 17, and it is mounted on the shaft 14 so as to have motion of rotation with and longitudinal adjustment on said shaft. This is secured by any suitable means, as by the spline 25 of the drawings. Adjustment of the driven wheel 24, radially of the disks 18 and 19, and longitudinally of the shaft 14, is secured by a rod 27 having a yoke 28 engaging a circumferential channel in the rearwardly extending hub of the wheel 24. The rod 27 is connected at its forward end by links 29 with a pair of arms 30 carried by a rock shaft 31. The rock shaft 31 has end bearings in the frame 4 and is rocked by means of a hand lever 32. The lever 32 has a dog to engage notches in a segmental rack 33 on the side of the frame 4, whereby given positions of the lever 32 are retained. The rod 27 is guided by a sleeve 34 supported by the frame 4 on standards 35. The range of movement of the driven wheel 24 is from that shown in Figs. 2 and 3, near the greatest diameters of the disks 18 and 19, to a position of reverse drive which is secured by the movement of the wheel 24 to the opposite side of the axis of revolution of said disks from that of high speed shown in Figs. 2 and 3. One of the intermediate positions is shown in Fig. 1, which represents the driven wheel 24, at low speed but not at the lowest speed attainable, which decreases to nothing at the axis of rotation of the two disks.

As both the driving and the driven contacts with the disks 18 and 19 are made against the sides of the latter, a very considerable end-thrust is developed on their stub shafts 20, and it is therefore desirable to secure adequate bearings against the outer ends of the shafts 20, with the most approved means for reducing the friction. I secure the desired results by terminating the shafts 20 at their outer ends in circular disks 36, and adjacent to each of these I provide similar disks 37, and in their adjacent faces I form the opposing halves of a ball race, in which balls 38 are assembled, as shown. The outer disks 37 are supported on vertical pivots 40 in suitable openings in their respective levers 41. The short arms of the levers 41 are pivoted in horizontal slots in brackets 42 to coiled springs 43 (see Fig. 2), to insure a yielding pressure of the levers when the springs 43 are overstrained, and the opposite long arms of the levers 41 are connected by horizontal links 44 with sleeves 45 mounted on a rock shaft 46 supported by the frame 4 and extending transversely of said frame. The outer ends of the sleeves 45 are oblique, forming cams which contact with correspondingly camshaped ends of sleeves 48 mounted on the rock shaft 46 and rotating with said shaft. The sleeves 45 are loosely mounted on the shaft 46. The shaft 46 has an arm 49, which is connected by a rod 50 with any suitable operating levers and locking means (not shown). When the shaft 46 is rocked in one direction, the action of cams 48 against cams 45 will move the latter inwardly on shaft 46, thereby swinging the long arms of the levers 41 inwardly and increasing the pressure of disks 37 against disks 36; and when the shaft 46 is rocked in an opposite direction the tension of the springs 43 will return the levers 41 and cams 45 to their first positions. Irregularities in the bearing surfaces of disks 18 and 19, due to wear or other causes, make it desirable to release the pressure of said disks against wheel 24 while the latter is being shifted radially of said disks, and this release is secured by rocking the shaft 46, in the proper direction as above described, to secure the desired result.

As the wheel 24 is moved closer to the axis of rotation of the disks 18 and 19 a twisting movement at the points of contact with the wheel becomes more manifest, and this has a tendency to lessen the friction contact between the two disks and the wheel, and the efficiency of the transmission is proportionately reduced. To overcome this I provide means for swinging the disks 18 and 19 toward each other and against the wheel 24 progressively as the wheel travels forward on its shaft 14. This is secured in connection with the pivotal mounting of the boxes 22 on frame 4 by means of the vertical pivots 23, already described, and also by additional means which I will now describe. Each box 22 has a rearwardly projecting arm 64 terminating in eccentric rings 65. The rings 65 operate in conjunction with eccentrics 66 on vertical shafts 67 supported by the frame 4. Arms 68 extend inwardly from the upper ends of the shafts 67, and are provided with slots 69 at their inner ends. Secured to the yoke 28 is a T-shaped member, the cross arms 29 of which have pins 70 which pass through slots 69 in the arms 68. By this construction, when the wheel 24 is moved forward by the rod 27 and yoke 28, the arms 68 are swung in the same direction by connection with the yoke through the T-shaped member and the cam shafts 67 are rocked in a direction to swing the arms 64 inwardly thereby swinging the disks 18 and 19 in against the wheel 24 increasingly as the latter moves forward on the shaft 14. This action is automatic, and the cumulative movement of the two disks toward the wheel 24, which is desirable can be nicely proportioned by suitably proportioning the cams on the shaft 67.

A maximum pressure of the two disks against the wheel 24 is secured by making the stem of the T-shaped extension from the yoke 28 in two telescoping members which are held from extension by a compression spring 73, but by compressing the spring the stem will be lengthened so as to permit the inward movement of wheel 24 without additional swing of the disks 18 and 19 against it.

The outward swing of the disks 18 and 19, away from the driving wheel 17, is prevented by pressure wheels 74, bearing against the outer sides of disks 18 and 19 at places directly opposite the contacts of wheel 17 with said disks.

Each pressure wheel 74 is loosely mounted on its horizontal shaft 75. One end of shaft 75 is hinged to the adjacent box 22, and the opposite or front end of the shaft terminates with a ring 76 which surrounds an eccentric 77 on a vertical rock-shaft 78. The lower end of the rock-shaft 78 has a socket which receives a ball 79 (shown in dotted lines in Figs. 3 and 4), the ball being on a bracket which is attached to the frame 4. This provides a support for the lower end of the shaft 78 which permits of a universal swinging adjustment of the upper end of the shaft. By suitably rocking the shaft 78 the shaft 75 will be moved toward the adjacent disk carrying its wheel 74 into contact with the disk. This rocking of the shaft 78 is secured by an arm 79, the end of which is longitudinally slotted and receives a pin 80 carried by rod 27. The shafts 78 are thus automatically rocked by the travel of rod 27. A regulated pressure is at all times insured by a spring 82 between the eccentric ring 76 and the nearest lever 41. The ends of the spring 82 are seated in suitable sockets in the ring and lever, as shown. The pressure of the wheels 74 may be released by rocking shaft 46 in a direction to swing the levers 41 outwardly because such outward movements of levers 41 release the pressure of springs 82 against the vertical rock shafts 78.

The mechanism controlled by the rock shafts 67 may be omitted, if desired, and the pressure wheels 74 and above described operative parts relied upon for holding the disks 18 and 19 against wheels 17 and 24, or the wheels 74 and these operative parts may, if desired, be omitted and in either case good results will be obtained.

I have explained the operation of the various parts of my device so fully in connection with their detailed description that the operation of my invention is well understood from what has been said, and further description is deemed unnecessary.

While I have described my invention with more or less minuteness as regards details of construction and arrangement and as being embodied in certain precise forms I do not desire to be limited thereto unduly or any more than is pointed out in the claims. On the contrary, I contemplate all proper changes in form, construction and arrangement, the omission of immaterial elements and the substitution of equivalents as circumstances may suggest or necessity render expedient.

I claim:

1. In a power transmission mechanism, a pair of opposite friction disks, a rotating driving wheel between and drivingly contacting said disks, a wheel between the two disks driven by friction therefrom, means for moving the last wheel diametrically of the disks, and automatic means operating simultaneously with the movement of said last wheel for varying the angular relation of said two disks to each other.

2. In a power transmission mechanism, a pair of opposite friction disks, a rotating driving wheel between and drivingly contacting said disks, a wheel between the two disks driven by friction therefrom, means for moving the last wheel diametrically of the disks, means for varying the angular relation of said two disks to each other, and means for automatically varying the distance between the two disks as the driven wheel is moved with relation to the driving wheel.

3. In a power transmission mechanism, a pair of opposite friction disks, a rotating driving wheel between and drivingly contacting both disks, pressure wheels bearing against the outside of the friction disks opposite the points of contact of said driving wheel, a friction wheel driven by said disks, means for moving the last wheel diametrically of said disks, and means for automatically varying the distance apart of said pressure wheels against their disks as the driven wheel is moved diametrically of the disks.

4. In a power transmission mechanism, a pair of substantially parallel and opposed friction disks, a rotating driving wheel between and drivingly contacting both of said disks, a driven friction wheel driven by said disks, means for moving the last wheel diametrically of said disks, and automatic means for varying the distance between the two disks as the driven wheel is moved with relation to said driving wheel.

5. In a power transmission mechanism, a pair of substantially parallel and opposed friction disks, a rotating driving wheel between and drivingly contacting both of said disks, a driven friction wheel driven by said disks, means for moving the last wheel diametrically of said disks, and automatic means for increasingly forcing the two disks toward said driving wheel as the driven wheel is moved toward said driving wheel.

6. In a power transmission mechanism, a pair of substantially parallel and opposed friction disks, a rotating driving wheel between and drivingly contacting both of said disks, a driven friction wheel driven by said disks, means for moving the last wheel diametrically of said disks, pressure wheels bearing against the outside of the friction disks opposite their contacts with said driving wheel, and automatic means for varying the pressure of said pressure wheels as the driven wheel is moved with relation to said driving wheel.

7. In a power transmission mechanism, a pair of substantially parallel and opposed friction disks, a rotating driving wheel between and drivingly contacting both of said disks; a driven friction wheel driven by said disks, means for moving the last wheel diametrically of said disks, pressure wheels bearing against the outside of the friction disks opposite their contacts with said driving wheel, and means operated by connection with said means for moving the driven wheel, for automatically regulating the pressure of the pressure wheels against their disks.

8. In a power transmission mechanism for conveyances, a pair of continuously rotating disks, a wheel driven by said disks, means for moving the wheel diametrically of said disks, and means for varying the angular relation of the two disks to each other as the distance of the wheel from the axis of rotation of the disks is varied.

9. In a power transmission mechanism, a pair of continuously rotating disks, a wheel driven by said disks, means for moving the wheel diametrically of said disks, and elastic means for varying the angular relation of the two disks to each other as the distance of the wheel from the axis of rotation of the disks is varied.

10. In a power transmission mechanism, a pair of continuously rotating disks, a wheel driven by said disks, means for moving the wheel diametrically of said disks, and automatic means for varying the angular relation of the two disks to each other as the distance of the wheel from the axis of rotation of the two disks varies.

11. In a power transmission mechanism, a pair of continuously rotating disks, a wheel driven by said disks, means for moving the wheel diametrically of said disks, and means for increasing the angular relation of the disks to each other as the wheel is moved from a position of maximum speed, and for decreasing said angular relation as the wheel is moved toward said position of maximum speed.

12. In a power transmission, a pair of continuously rotating disks, a wheel driven by said disks, means for moving the wheel diametrically of said disks, and automatic elastic means for increasing the angular relation of the disks to each other as the wheel is moved from a position of maximum speed, and for decreasing said angular relation as the wheel is moved toward said position of maximum speed.

13. In a power transmission, a pair of continuously rotating disks, stub shafts on which the disks are mounted, journal boxes in which the shafts are mounted, said boxes having a swinging adjustment laterally of the stub shafts to vary the angular relation of the two disks to each other, means for swinging said journal boxes, a wheel driven by said disks, and means for moving the wheel diametrically of said disks.

14. In a power transmission, a pair of continuously rotating disks, stub shafts on which the disks are mounted, journal boxes in which the shafts are mounted, means for permitting of a swinging adjustment of the boxes laterally of the stub shafts to vary the angular relation of the two disks to each other. a wheel driven by the two disks, means for moving the wheel diametrically of said disks, and means associated with the movement of the wheel for automatically swinging said journal boxes to vary the angular relation of the two disks as said wheel is moved between them.

In witness whereof, I, have hereunto set my hand and seal at Sheridan, Indiana, this ninth day of January, A. D. one thousand nine hundred and thirteen.

JOSEPH A. McGEE. [L. S.]

Witnesses:
SIMEON COX,
I. H. McMURTRY.

Copies of this patent may be obtained for five cents each, by addressing the "Commissioner of Patents, Washington, D. C."